United States Patent
Galloway et al.

(10) Patent No.: US 6,765,749 B2
(45) Date of Patent: Jul. 20, 2004

(54) FREQUENCY ATTENUATING FILTER APPARATUS AND METHOD FOR A DATA STORAGE DEVICE

(75) Inventors: Paul A. Galloway, Prior Lake, MN (US); Mohammad A. Miah, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 408 days.

(21) Appl. No.: 10/056,337

(22) Filed: Jan. 24, 2002

(65) Prior Publication Data

US 2003/0048569 A1 Mar. 13, 2003

Related U.S. Application Data

(60) Provisional application No. 60/317,176, filed on Sep. 5, 2001.

(51) Int. Cl.[7] .............................................. G11B 5/596
(52) U.S. Cl. .................................. 360/78.04; 360/77.02
(58) Field of Search ........................... 360/78.04, 78.09, 360/75, 77.02

(56) References Cited

U.S. PATENT DOCUMENTS 5,325,247 A    6/1994   Ehrlich et al.
6,219,196 B1   4/2001   Semba et al.
6,246,536 B1   6/2001   Galloway

*Primary Examiner*—David Hudspeth
*Assistant Examiner*—Mitchell Slavitt
(74) *Attorney, Agent, or Firm*—Kirk A. Cesari

(57) ABSTRACT

An attenuating filter for the servo control processor of a disc drive data storage device. The filter is constructed by determining the peak resonance in the structure frequency response above a preselected magnitude and computing a digital notch filter to attenuate that peak resonance. The notch filter domain is then summed with the structure frequency response to derive a modified structure frequency response. The modified structure frequency response is substituted for the unfiltered structure frequency response and again the peak resonance in the modified structure frequency response above a preselected magnitude is determined and a notch filter is computed as necessary. This process of summing the structure frequency response with the latest computed notch filter domain to derive a modified structure frequency response continues until the peak resonance of the latest modified structure frequency response is less than the preselected magnitude.

17 Claims, 9 Drawing Sheets

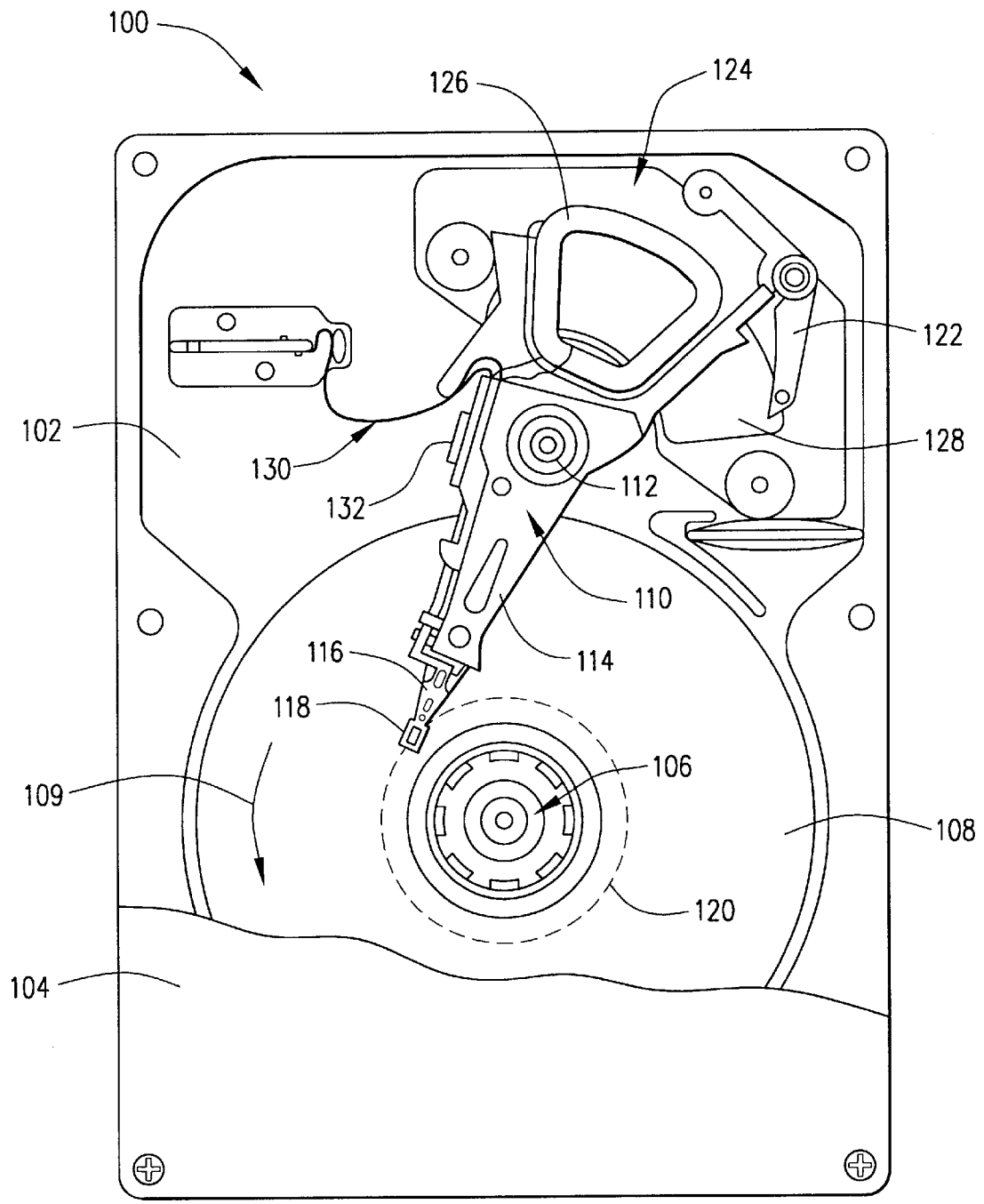
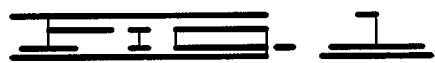

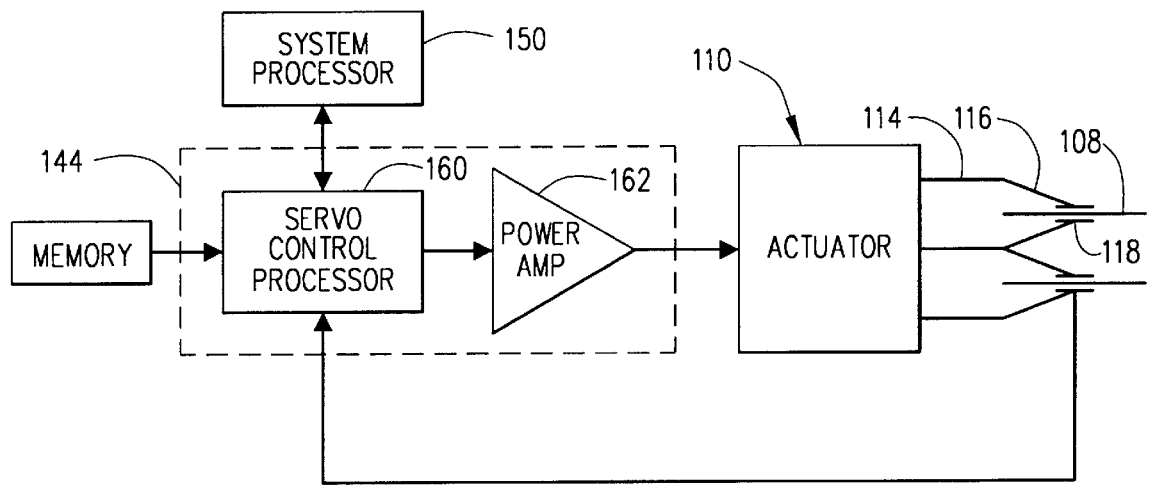
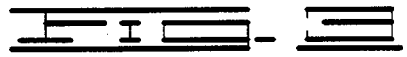
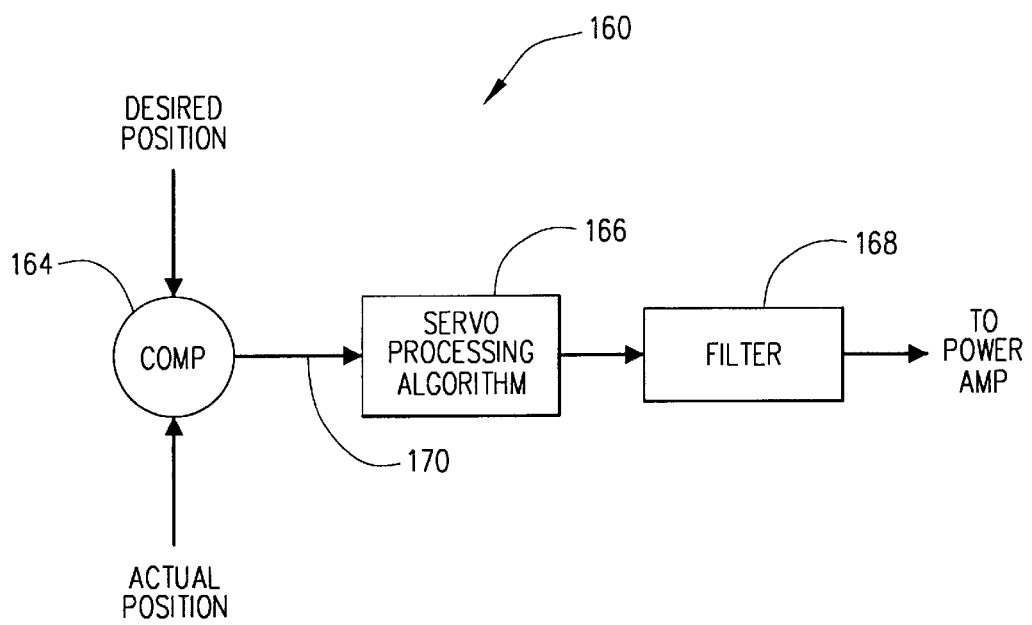
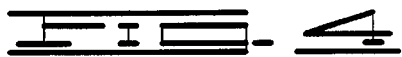

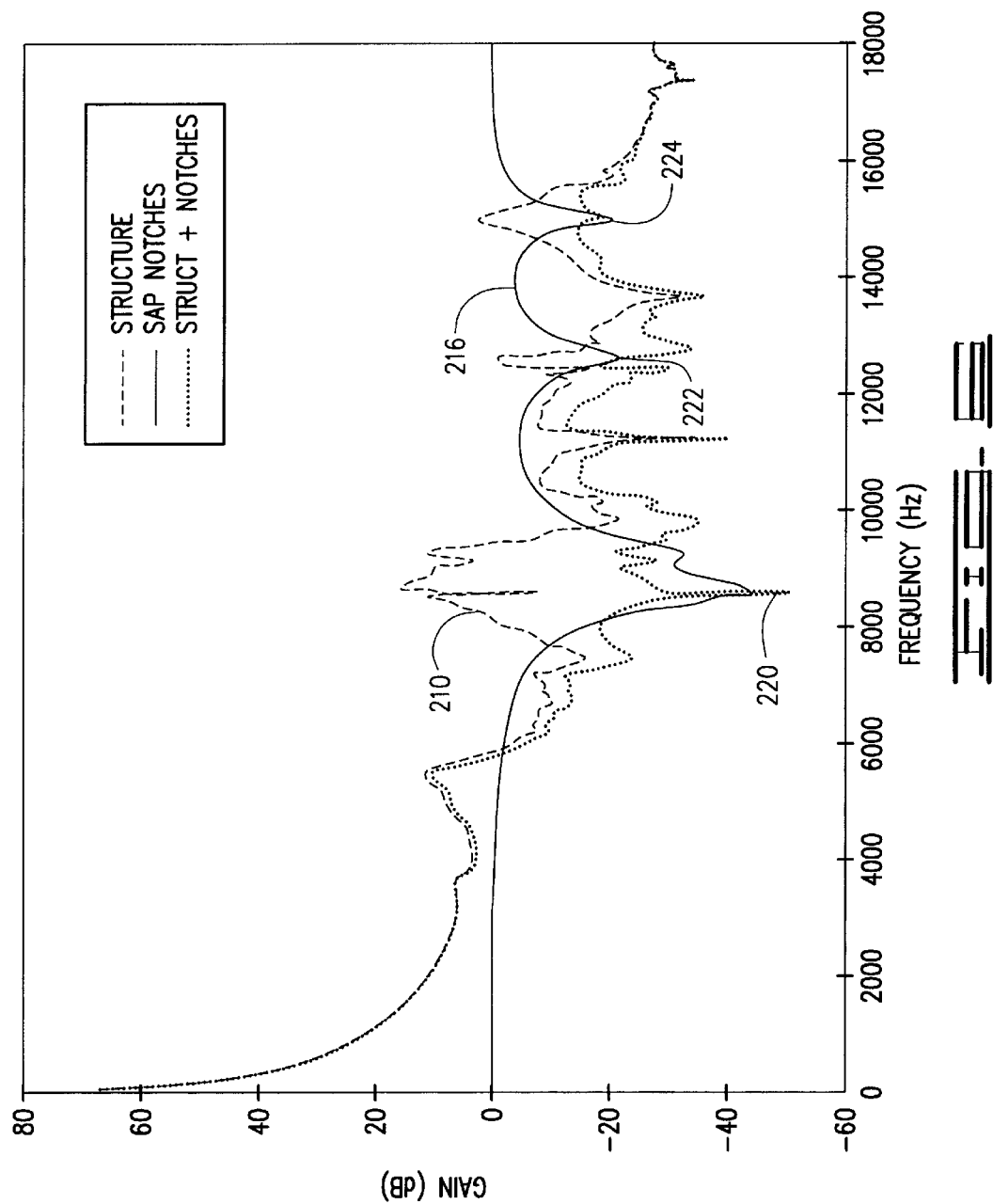

FREQUENCY ATTENUATING FILTER APPARATUS AND METHOD FOR A DATA STORAGE DEVICE

CROSS REFERENCE TO RELATED APPLICATIONS

This application claims the benefit of U.S. Provisional Application No. 60/317,176 filed on Sep. 5, 2001.

FIELD OF THE INVENTION

This invention relates generally to the field of data storage devices and more particularly but without limitation to reducing resonant oscillation of the data storage device mechanical structure.

BACKGROUND OF THE INVENTION

Modern data storage devices such as disc drives are commonly used in a multitude of computer environments to store large amounts of data in a form that is readily available to a user. Generally, a disc drive has a magnetic disc, or two or more stacked magnetic discs, that are rotated by a motor at high speeds. Each disc has a data storage surface divided into a series of generally concentric data tracks where data is stored in the form of magnetic flux transitions.

A data transfer member (sometimes referred to as a read/write head) such as a magnetic transducer is moved by an actuator assembly to selected positions adjacent the data storage. The active elements of the read/write head are supported by suspension structures extending from the actuator assembly. The active elements are maintained a small distance above the data storage surface as the read/write head flies upon an air bearing generated by air currents caused by the spinning discs.

Each read/write head is typically provided with separate read and write elements, with a common configuration utilizing a thin film, inductive write element and a magneto-resistive (MR) read element. Data are written by passing a write current through the write element, with the write current generating a time-varying magnetic field which accordingly magnetizes the disc surface. Previously written data are read using the read element to transduce the selective magnetization of the disc to generate a read signal which is received by a read channel to reconstruct the data.

The actuator assembly operates within a negative feedback, closed-loop servo system. In this manner, the actuator moves the data head radially over the disc surface for track seek operations and holds the transducer directly over a track on the disc surface for track following operations. A servo controller samples the position of the read/write heads relative to some reference point and generates an error signal based upon the difference between the actual position and the reference position. This error signal is then used to drive the data head to the desired reference point, typically by demanding a current through a voice coil motor (VCM) which forms a part of the actuator assembly.

Thus, a disc drive mechanical structure is composed of multiple mechanical components that are pieced together to form the final disc drive assembly. Each of these components has various resonant modes that if excited by an external energy source will cause the part to physically move at the natural frequencies of oscillation for the component in question. This movement can occur in a bending mode, a twisting mode or a combination of the two. If the component is highly undamped (i.e. the resonance is high amplitude, narrow frequency band) it will tend to oscillate with a minimal external driving energy. This oscillation results in physical motion of the read/write head, causing off track errors and potential fly height problems. These oscillations are often referred to as "resonances."

If resonances occur in a disc drive, they can severely limit drive performance, both in seek mode and track-follow mode. To obtain the optimal disc drive performance requires that there be no resonances present. However, this scenario is not physically possible. Every mechanical component has a natural frequency of oscillation. Nevertheless, it is desirable to reduce or minimize the resonances. One way of doing this is to mechanically damp the mechanical components and thereby decrease the amplitude of the resonant mode. This can be done by careful design, the end result being a reduction in the amplitude of the oscillation to a level that is deemed acceptable to achieve a desired drive performance.

However, there are situations where a component is not able to be mechanically damped. This could occur, for example, because of materials used or because of design time constraints. When this scenario occurs, the only way to improve drive performance is to make sure that no excitation energy at the natural frequency of oscillation reaches the mechanical component to start it oscillating. The present invention concentrates on this approach.

As mentioned above, typical disc drives demand a current through a voice coil motor (VCM) to drive the read/write head to the desired position. When a frequency spectrum of demand current is analyzed it is found that the spectrum is composed of frequency components from direct current (DC) all the way up to multiple kilohertz (KHz). If VCM current is driving the actuator assembly at the same frequency as the natural frequency of a mechanical resonant mode of a mechanical component, the energy may be sufficient to excite the mechanical structure into oscillation. This is very undesirable and will at least degrade disc drive performance or at worst will cause the servo system to go unstable.

The method employed by servo engineers to minimize the chances of the mechanics oscillating is to use hardware electronic filtering and/or digital filtering of the VCM current via a microprocessor or digital signal processor. Both types of filters achieve the same overall result in that they reduce the driving force energy (i.e. the current flowing) at frequencies deemed a concern.

One type of filter that is widely used to remove driving energy at the mechanical resonant modes is known as a notch filter. A notch filter is a band-rejection filter that produces a sharp notch in the frequency response curve of the disc drive. When a notch filter is activated by the servo control loop, the open loop response ends up a summation of the original response plus the notch filter response. If the notch filter is centered about the frequency where the peak amplitude of the mechanical resonance occurs, then the driving force energy at this frequency can be reduced so that there will be little or no energy made available to excite the mechanical structure.

One problem associated with notch filters, however, is that if the center frequency of the mechanical resonance does not align with the center frequency of the notch filter then the attenuation of the driving current may not be sufficient to prevent the structure from oscillating. This surely occurs when the mechanical resonance shifts in frequency, and often occurs due to the part-to-part variation between individual disc drives.

One solution is to include a number of notch filters designed to cover a spread in mechanics. Such a filter, for example, is described in U.S. Pat. No. 5,032,776. These filters remove some driving energy unnecessarily, however, such as at non-resonant frequencies. Such approaches do not provide the optimal solutions, and do not guarantee that resonance won't occur.

Another solution is to calculate and store a notch filter for each of the heads in an actuator assembly, such as is described in U.S. Pat. No. 6,246,536. These and other similar approaches that attempt to reduce the mechanical complexity of the structure do not focus on deriving an optimal filter response. Rather, the filter sought after is one that simplistically computes one or more digital notch filters associated with the peak resonances in the structure frequency response. It has been determined that an optimal composite attenuating filter is derived by first summing the observed frequency response of the structure with the frequency response of the first computed notch filter to derive a modified frequency response of the structure, then computing the next notch filter on the basis of the modified frequency response of the structure. Such an approach empirically aligns the attenuating frequencies of the composite attenuating filter with the resonant frequencies of the structure, thereby minimizing the driving energy necessary to prevent oscillation. It is to these improvements and others as exemplified by the description and appended claims that embodiments of the present invention are directed.

SUMMARY OF THE INVENTION

Embodiments of the present invention are directed to a data storage device comprising a data storage disc adapted to store data and an actuator assembly. The actuator assembly comprises a read/write head adapted to read data from and write data to the disc, and an actuator arm coupled to the head and controllably positionable to move the head relative to the disc in response to a driving energy. The data storage device further comprises a servo control circuit providing the driving energy, comprising an attenuating filter limiting the driving energy at resonant frequencies of the data storage device mechanical structure, the attenuating filter constructed by a process comprising: (a) initiating a track seek condition moving the head to a selected track of the data storage disc; (b) measuring the structure frequency response of the data storage device in terms of magnitude versus frequency between selected first and second frequencies; (c) determining the peak amplitude of the magnitude in step (b); (d) determining the frequency associated with the maximum amplitude of step (c); (e) computing a notch filter centered at the frequency of step (d); (f) saving the notch filter in memory; (g) creating a theoretical frequency domain of the attenuating filter as the sum of all the notch filters in memory of step (f) in terms of magnitude versus frequency; (h) combining the frequency response of the structure from step (b) and the frequency domain of the attenuating filter from step (g), deriving a modified structure frequency response; (i) substituting the modified structure frequency response of step (h) for the structure frequency response in step (b) and repeating steps (c) through (h) until the peak amplitude of step (c) is less than a desired magnitude; and (j) combining all the notch filters in memory of step (f), defining the attenuating filter; and a servo control processor recalling and implementing the attenuating filter of step (j), controlling the driving energy to position the actuator assembly.

These and various other features as well as advantages which characterize the present invention will be apparent upon reading of the following detailed description and review of the associated drawings.

BRIEF DESCRIPTION OF THE DRAWINGS

FIG. 1 is a plan view of a data storage device constructed in accordance with an embodiment of the present invention.

FIG. 3 is a diagrammatic block illustration of the servo control circuit of FIG. 2.

FIG. 4 is a diagrammatic block diagram of a servo control processor constructed in accordance with an embodiment of the present invention.

FIG. 7 is a Bode plot showing the effect of a series of digital notch filters derived by prior art methodology in response to resonances at different frequencies within a selected band.

FIG. 8 is a Bode plot similar to FIG. 7 but showing the effect of a series of digital notch filters derived in accordance with an embodiment of the present invention.

DETAILED DESCRIPTION

Figure 2:
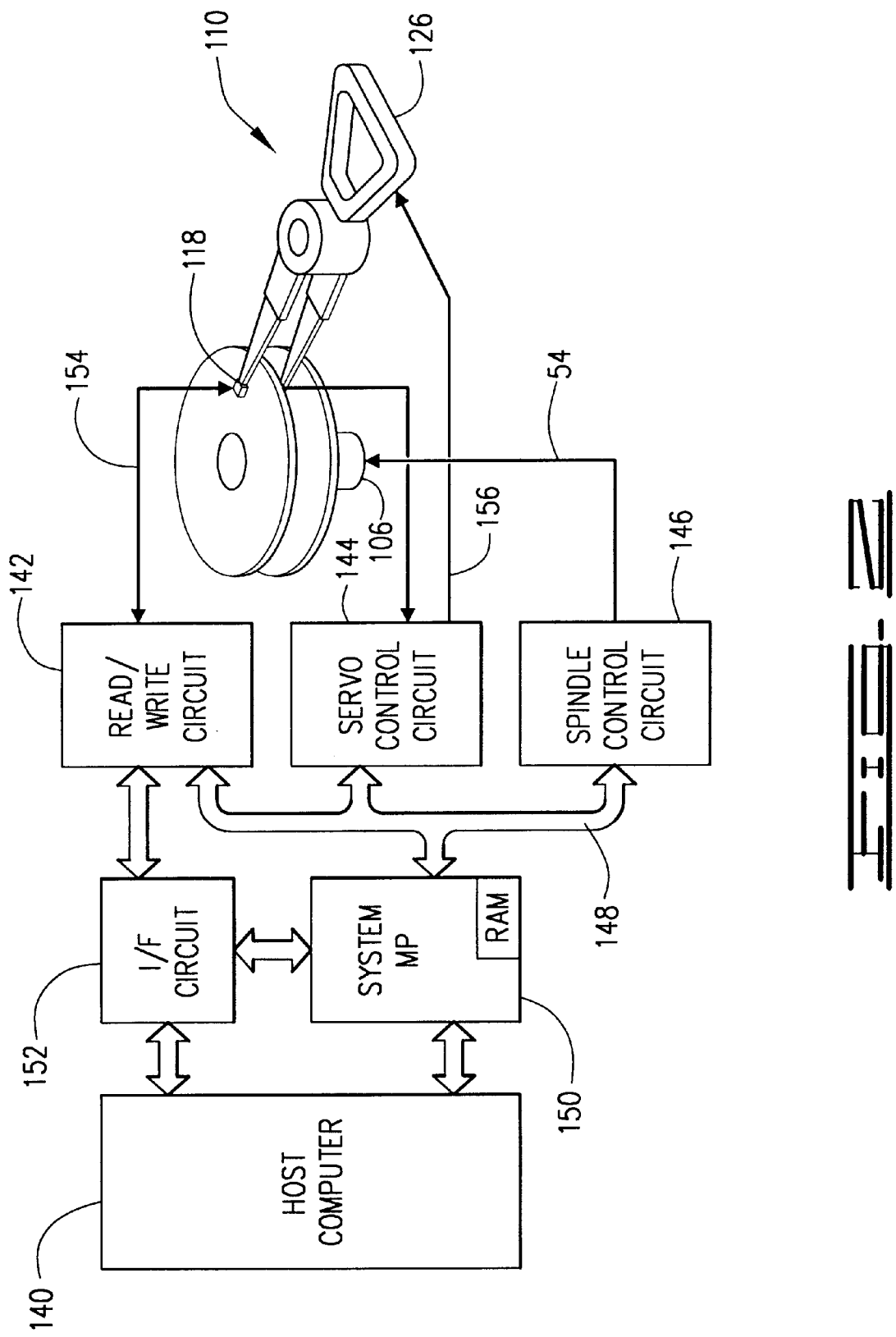
FIG. 2 is a functional block diagram of the data storage device of FIG. 1.

FIG. 1 provides a top plan view of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form an internal, sealed environment for the disc drive 100.

A spindle motor 106 rotates a plurality of magnetic recording discs 108 at a constant high speed (in thousands of revolutions per minute) in a direction denoted by arrow 109. User data are written to and read from tracks on the discs 108 through the use of an actuator assembly 110, which rotates about a bearing shaft assembly 112 adjacent the discs 108. The actuator assembly 110 includes a plurality of rigid actuator arms 114 which support flexible suspension assemblies ("flexures") 116. A read/write head ("head") 118 is supported at the end of each flexure 116 to interface with the corresponding disc surfaces.

When the disc drive 100 is not in use, the heads 118 are parked on landing zones 120 and the actuator assembly 110 is secured using a magnetic latch assembly 122. A voice coil motor (VCM) 124 controls the position of the heads 118 through application of a current, or "driving energy," to a coil 126 which interacts with a magnetic circuit including a permanent magnet 128. A flex assembly 130 facilitates electrical communication between the actuator assembly 110 and a disc drive printed circuit board (PCB) mounted to the underside of the base deck 102, with the flex assembly 130 including a preamplifier/driver circuit 132 (preamp) which electrically interfaces with the heads 118. The disc drive PCB houses the electronic circuitry used to control the operation of the disc drive 100.

Turning to FIG. 2, shown therein is a simplified functional block diagram of the disc drive 100 of FIG. 1, operably connected to a host computer 140. More particularly, FIG. 2 shows the disc drive 100 to generally comprise a read/write circuit 142, a servo control circuit 144, and a spindle control circuit 146, all operably connected by way of control bus 148 to a system processor 150. It will be recognized that the control bus 148 comprises the necessary connections for the system processor 150 to communicate with and control these disc drive circuits. Additionally, an interface circuit 152 is shown connected to the read/write circuit 142 and to the system microprocessor 150, with the interface circuit 152 as a data interface for the disc drive.

As will be recognized, the spindle control circuit 146 controls the rotational speed of the spindle motor 106 in a conventional manner. A detailed discussion thereof is not necessary for an understanding of the present invention.

The read/write circuit 142 passes data to be written to and read from the disc 108 by way of the signal path 154 and the head 118 in a conventional manner. A detailed discussion thereof is not necessary for an understanding of the present invention.

The servo control circuit 144 receives servo position information from one or more heads 118, whether a dedicated servo or embedded servo system respectively, and in response thereto provides a correction signal, or driving energy, by way of signal path 156 to the coil 126 of the actuator assembly 110. FIG. 3 is a diagrammatic block diagram depicting this negative feedback, closed-loop servo system, wherein the servo control circuit 144 comprises a servo control processor 160 and an amplifier 162.

The system processor 150 receives a command signal from the host 140 (FIG. 2) which indicates that a certain portion of a disc 108 is to be accessed. In response to the command signal, the system processor 150 provides servo control processor 160 with a signal indicating which head 118 is selected for reading from or writing to the disc 108. The system processor 150 also provides the servo control processor 160 with a position signal which indicates a particular cylinder over which the actuator assembly 110 is to position the heads 118.

Servo control processor 160 converts the position signal into an analog driving energy signal which is provided to the actuator assembly 110. In an illustrative embodiment, the driving energy signal is amplified by the power amplifier 162 which then provides the required driving energy to the actuator assembly 110. In response to the driving energy, the actuator assembly 1110 moves the data head 118 radially over the surface of the disc 108 for track seek operations and holds the data head 108 directly over a track on the disc 108 for track following operations. In an illustrative embodiment, the driving energy comprises an electrical current which is supplied to the coil 126 portion of the actuator assembly 110.

The servo control processor 160 samples the position of the head 118 and compares the actual position of the head 118 with the desired position requested by the system processor 150. Based upon the difference between the actual position and the desired position of the head 118, the servo control processor 160 then generates a corrective driving energy signal which is provided to the actuator assembly 110.

FIG. 4 is a simplified block diagram of the servo control processor 160 of FIG. 3, comprising a comparator 164, a servo processing algorithm 166, and an attenuating filter 168. The comparator 164 receives an input signal from the system processor 150 corresponding to the desired position of the head 118, as well as the feedback signal from the head 118 corresponding to the actual position of the head 118.

Based on the difference between the desired and actual position, the comparator 164 generates a position error signal (PES) along path 170. The PES is provided to the servo processing algorithm 166, which generates a driving energy signal which is composed of frequency components which range from direct current (DC) to multiple kilohertz or higher. The driving energy signal is provided to the filter 168, which reduces the frequency components which are at or are near the resonance frequencies of the disc drive mechanical structure. The filter 168 then provides the filtered driving energy to the actuator assembly 110, either directly or via the amplifier 162 (FIG. 3).

Figure 5:
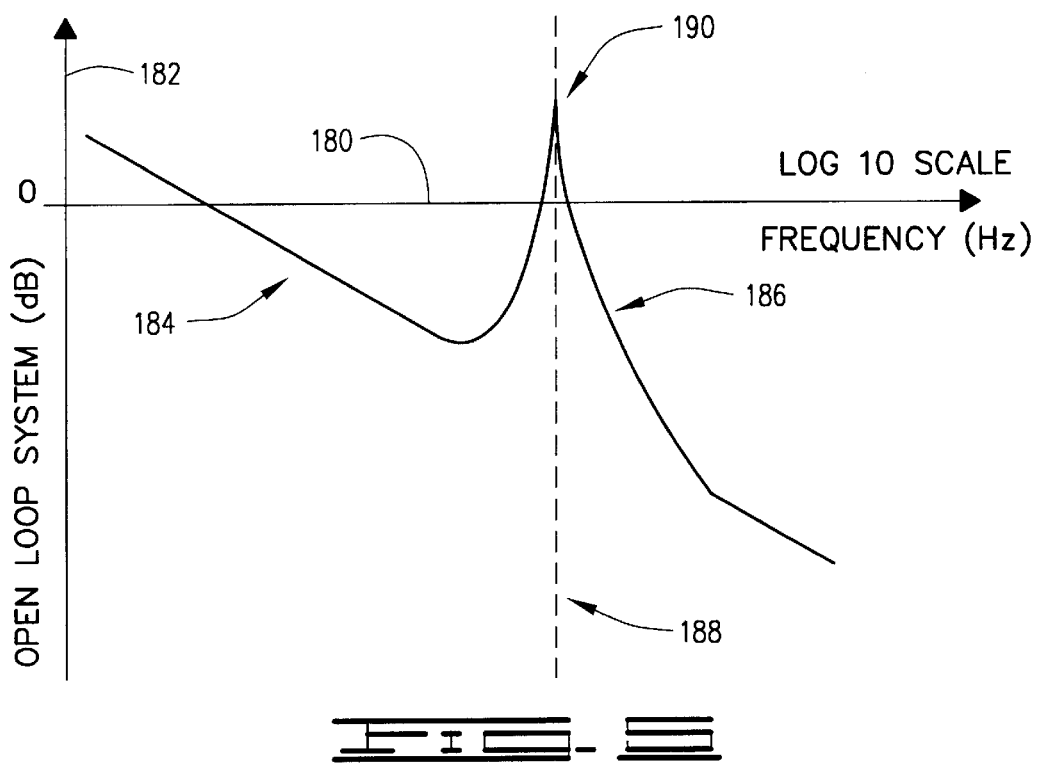
FIG. 5 is a Bode plot showing a mechanical resonance in a disc drive.
Figure 6:
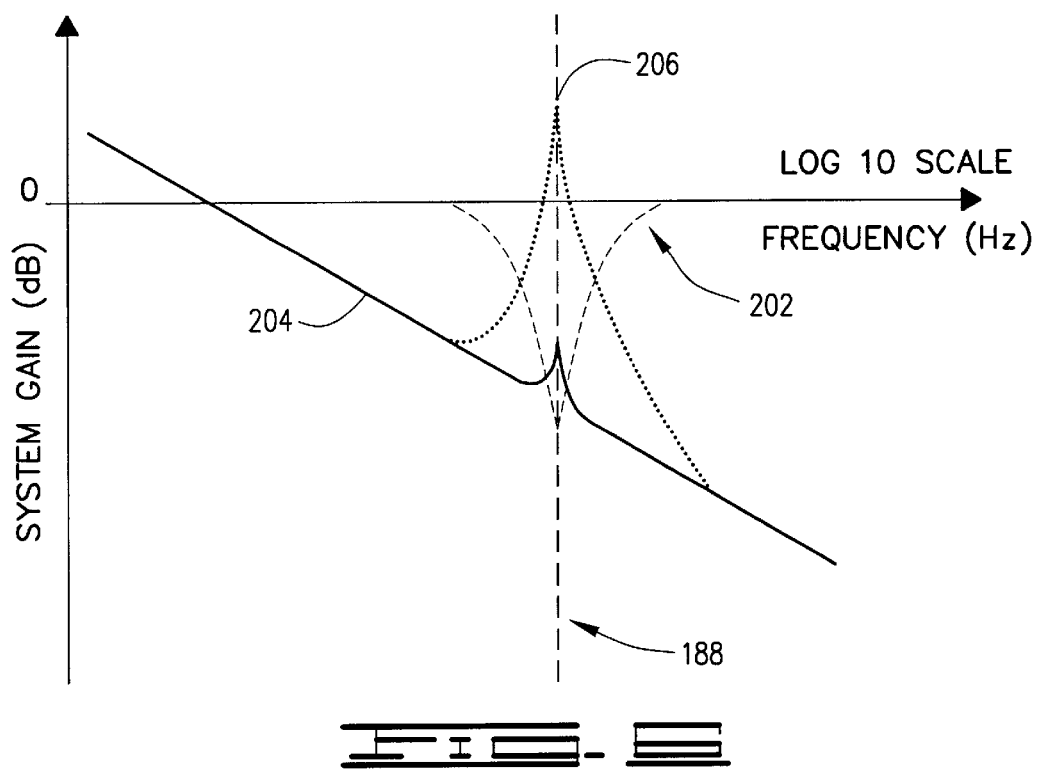
FIG. 6 is a Bode plot showing the effect of a digital notch filter attenuating the resonance of FIG. 5.

The effect of the filter 168 can be seen by comparing the Bode plots of FIGS. 5 and 6. As discussed above, each of the mechanical components of the disc drive 100 has various resonant modes that, if excited by an external energy source, will cause the part to oscillate at the natural resonance frequencies of the component. FIG. 5 is an open loop Bode plot showing an illustrative mechanical resonance in a disc drive. For clarity sake, the phase information has been removed from the Bode plot and the plot is not shown to scale. The x-axis 180 represents the frequency of the excitation energy, while the y-axis 182 represents the open loop system gain in decibels (dB). The open loop system gain 184 generally drops at the rate of 20 dBs per decade. However, a mechanical resonance causes a sharp increase 186 in the system gain. The resonance 186 in FIG. 5 is centered at frequency 188 and has a peak amplitude 190. A mechanical resonance could cause the servo control loop to go unstable if the phase response goes through −180° when the gain is above 0 dB. Therefore, because the peak amplitude of the gain of the resonance frequency in FIG. 5 exceeds 0 dB, the resonance could lead to control instability.

Typically, the attenuating filter 168 comprises one or more computed digital notch filters, corresponding to the characteristic structure frequency response. The effect of a notch filter 168 can be seen in the Bode plot of FIG. 6, which is similar to FIG. 5. The frequency domain of the notch filter 202 corresponds to the observed structure frequency response, namely, the notch filter 202 is centered around the resonant frequency 188 so as to attenuate the resonance 186. In this illustrative example wherein the attenuating filter 168 consists of the notch filter 202, the open loop response 204 with the filter 168 activated is the sum of the structure frequency response 184 and the frequency domain of the notch filter 202.

Various methods of computing an appropriate notch filter are known. In an illustrative embodiment, the computing comprises implementing a bilinear transfer function of the form:

where G is the gain of the filter, z is the sampling rate of the servo system, and A1, A2, B0, B1, and B2 are digital notch filter constants describing the frequency, depth and width of the notch.

Thus, FIGS. 5 and 6 illustrate the conventional manner of attenuating resonant frequencies in the disc drive structure by way of implementing a single notch filter. What the prior art solutions fail to recognize, however, is the adverse cumulative effects of computing two or more notch filters for a given structure frequency response in this manner.

As noted previously, for a notch filter to be effective it must be centered about substantially the same frequency as the resonant frequency of the structure. Where two or more resonances are of concern, however, it has been determined that the computed notch filters do not necessarily align with the corresponding resonant frequencies. FIG. 7, for example, is a Bode plot for a disc drive showing the frequency response of the mechanical structure 210, the frequency domain of the notch filters 212 computed in accordance with prior art methodology, and the resulting open loop response 214 with the filters active. It will be noted that the cumulative effect is that none of the resonances of concern with the exception of the one at about 9 kHz has a corresponding notch filter aligned at substantially the same frequency. It will also be noted that the notch frequency domain of the notch filters 212 diminishes the driving energy of the open loop response 214 excessively at 10 kHz, 11 kHz, 12 kHz and 16 kHz, lessening the optimal response with which the actuator assembly will track seek or track follow. Furthermore, it will be noted that a peak amplitude of the open loop response near 0 dB still occurs at about 15 kHz, which is cause for concern that external excitation might still create adverse oscillations. The frequency domain of the filters 212 computed in FIG. 7 is not the optimal solution.

FIG. 8, in comparison, illustrates an optimal attenuating filter derived by an apparatus and associated method constructed in accordance with embodiments of the present invention. Like FIG. 7, the same frequency response of the mechanical structure 210 is shown. Unlike FIG. 7, however, the frequency domain of the computed notch filters 216 provides sharp attenuating responses in opposition to the peak amplitudes of concern, shown by reference point 220, 222 and 224. It will be further noted that the amount of diminishment of the driving energy is comparably less than in FIG. 7, making the system relatively more responsive in track seeking and track following.

An important point of novelty associated with the embodiments of the present invention lie in the basis with which multiple notch filters are computed making up the attenuating filter 168. In the prior art methodology of FIG. 7 the frequency response of the structure is the basis, and multiple notch filters are computed in association with corresponding resonances in the frequency response of the structure. In the embodiments of the present invention, contrarily, the observed frequency response of the structure is summed with the frequency domain of the first notch filter to derive a modified frequency response of the structure. The modified frequency response of the structure is then substituted for the observed frequency response of the structure, forming the basis for the computation of any additional notch filters as necessary.

Figure 9:
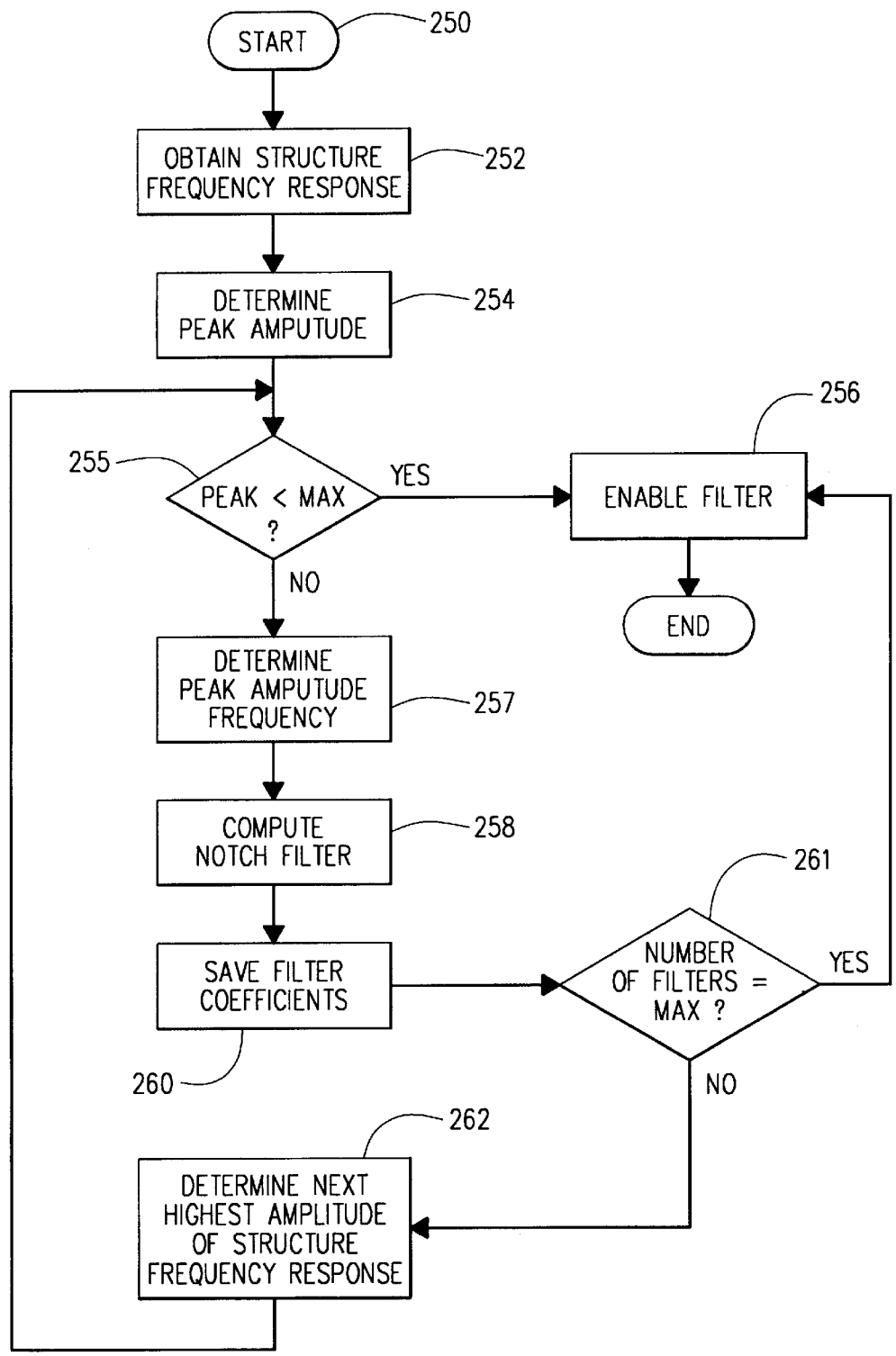
FIG. 9 is a flow diagram of a process for computing an attenuating filter comprising one or more digital notch filters in accordance with prior art methodology.
Figure 10:
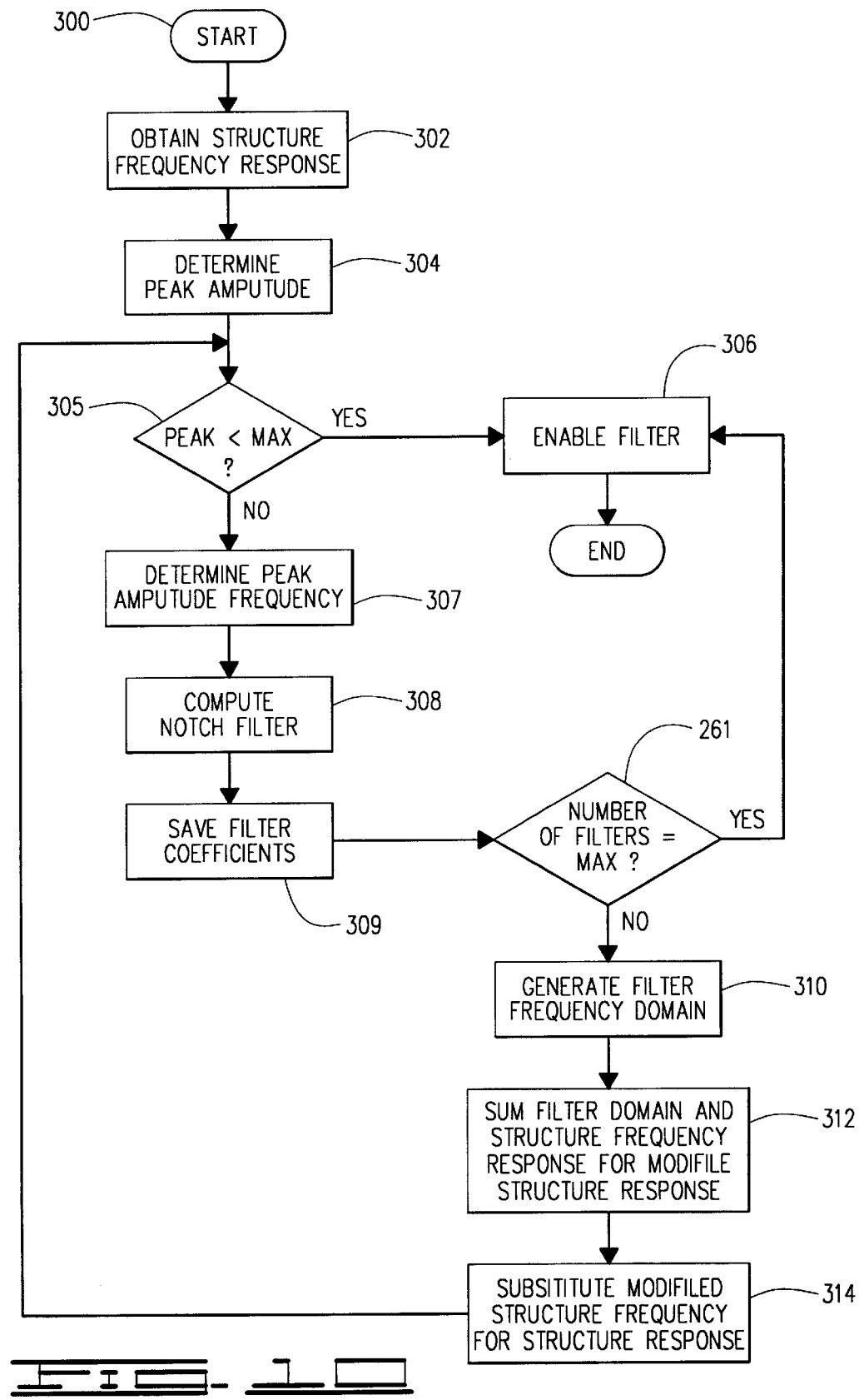
FIG. 10 is a flow diagram of a process for computing an attenuating filter comprising one or more digital notch filters in accordance with embodiments of the present invention.
Figure 11:
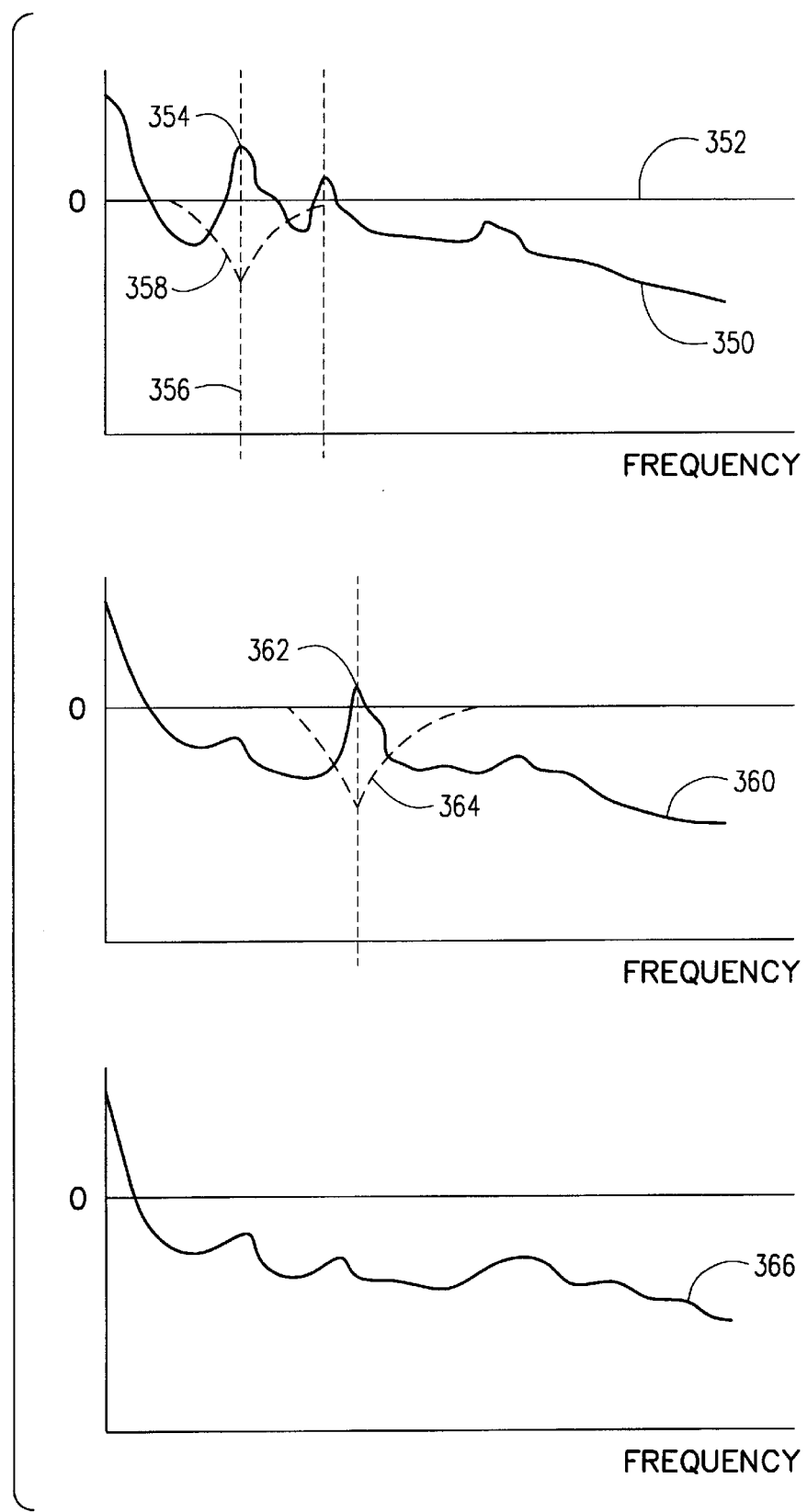

This distinction between the prior art and the embodiments of the present invention is reflected by comparison of FIGS. 9 and 10 which illustrate process flow charts for embodiments of the prior art and the present invention, respectively. The prior art process is shown in FIG. 9 beginning at block 250 wherein a seek to a track is initiated. The frequency response of the structure is observed within the bandwidth of concern in block 252. The peak amplitude is determined, such as by the peak detect method, in block 254. Control then passes to block 255 which determines whether the peak amplitude 254 is less than a preselected magnitude, such as less than 0 dB. If yes, then in block 256 the notch filters (if any) saved in block 260 are retrieved and enabled for the servo control processor. If no, then the frequency about which the peak amplitude is centered is determined in block 257. A notch filter is then computed in block 258 for the frequency of block 257. The coefficients of the notch filter of block 258 are then saved in memory in block 260. At block 261 it is determined whether the number of computed notch filters equals a preselected number. If no, then control then passes to block 262 where the next highest peak amplitude of the structure frequency response of block 252 is determined and input to block 255.

FIG. 10 illustrates a method for constructing an attenuating filter in accordance with an embodiment of the present invention, beginning at block 300 wherein a seek to a track is initiated. The frequency response of the structure is observed within the bandwidth of concern in block 302. The peak amplitude is determined, such as by the peak detect method, in block 304. Control then passes to block 305 which determines whether the peak amplitude of block 304 is less than a preselected magnitude, such as less than 0 dB. If yes, then in block 306 the notch filters (if any) computed in block 308 are enabled for the servo control processor. If no, then the frequency about which the peak amplitude 304 is centered is determined in block 307. A notch filter is then computed in block 308 for the frequency of block 307. The notch filter coefficients are saved in block 309, and then in block 311 it is determined whether the number of computed notch filters equals a preselected maximum number. To this point the process of FIG. 10 is the same as that of FIG. 9.

The coefficients of the computed filter of block 308 are then used to generate a frequency domain of the notch filter in block 310. Control then passes to block 312 where the frequency domain of the filter in block 310 is summed with the structure frequency response in block 302 to compute a modified structure response. Control then passes to block 314 where the modified structure response of block 312 is substituted for the structure response of block 302 and the process loops back to block 304 with the modified structure response forming the basis for further determination and computation of any additional notch filters.

Figure 11:
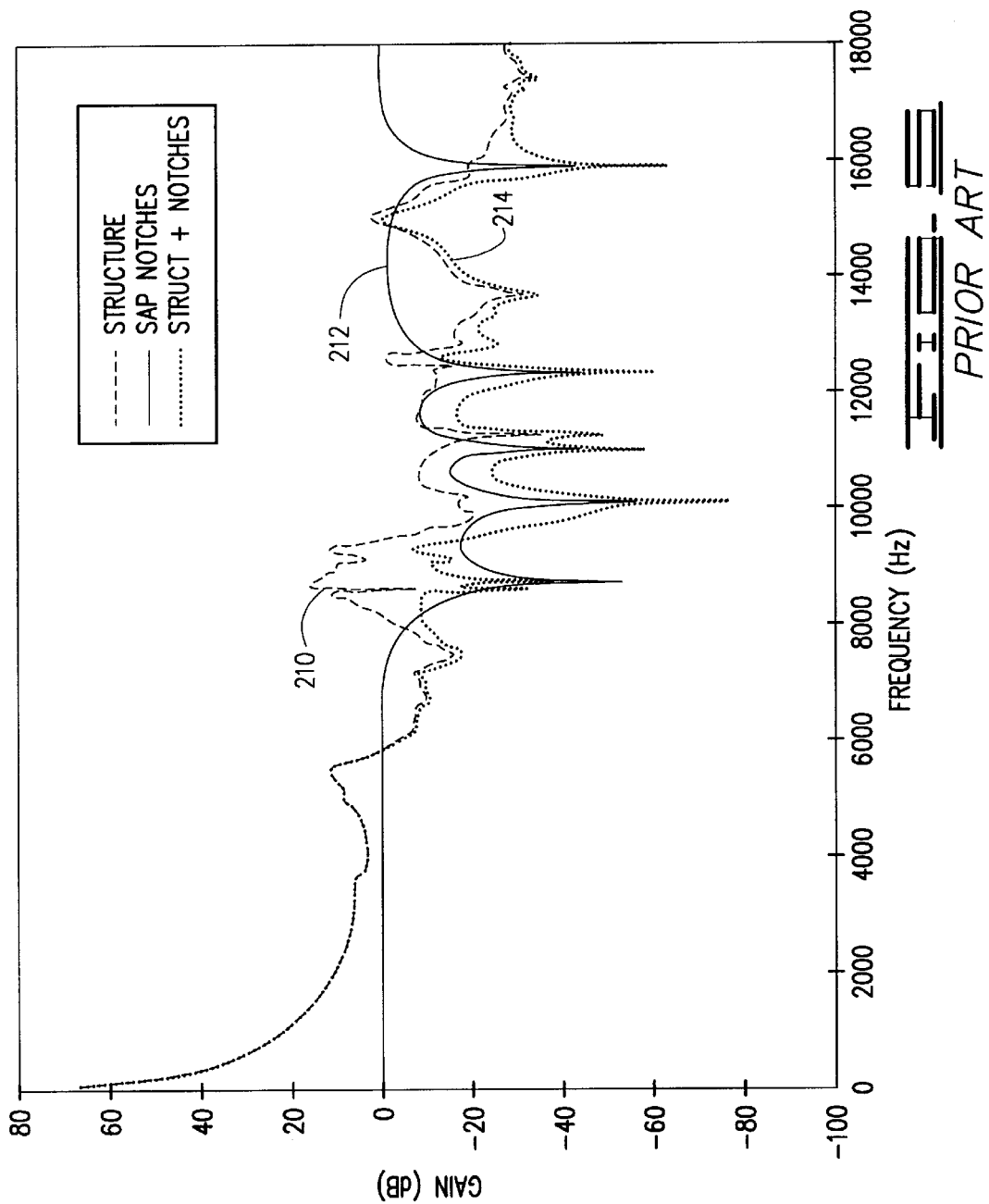
FIG. 11 is a diagrammatic illustration of sequential Bode plots showing the iterative attenuating effect of computing consecutive digital notch filters in accordance with embodiments of the present invention.

FIG. 11 illustrates the effects of a process within the embodiments of the present invention on the structure frequency response of a disc drive. In the first step, a track seek condition is initiated on the disc drive, moving the read/write head 118 to a selected track of the data storage surface. Next, the frequency response of the mechanical structure is measured in terms of magnitude versus frequency between selected first and second frequencies. For purposes of illustration, a preselected desired maximum amplitude in the structure frequency response is selected as 0 dB as shown by reference 352.

Next, the maximum amplitude 354 of the structure frequency response is determined, such as by the peak detect method. Then the frequency 356 associated with the maximum amplitude 354 is determined. Given these parameters, a notch filter centered around the frequency 356 is computed to attenuate the peak amplitude 354. The coefficients of the notch filter are then stored in memory. A theoretical frequency domain response for the notch filter is then generated in terms of magnitude versus frequency for all the notch filters stored in memory. In this example, so far only one notch filter has been stored in memory and the frequency domain is shown by reference 358.

Next, the structure frequency response 350 is summed with the frequency domain of the filter 358, deriving a modified structure frequency response 360. The modified structure frequency response 360 is then substituted for the structure frequency response 350 and then the process loops back to again determine whether the peak amplitude 362 is greater than the preselected maximum amplitude. In this example, another notch filter with domain response 364 is computed and summed with the modified structure frequency response 360 to derive yet another modified structure frequency response 366. Finally, it is determined that no peak resonances exist in the structure response 366, so the process is completed and the attenuating filter, comprising the digital filters computed, is defined.

It will be noted that an important advantage of the embodiments of the present invention lie in the fact that the application of the first notch filter 358 can effect a frequency shift in other resonances, such as peak 362. That is, the amplitude and frequency of the resonance 362, after application of the notch filter 358, is likely to be substantially different than the unfiltered response. The embodiments of the present invention, unlike the prior art methods, account for these shifts and accordingly more precisely aligns the notch filters with the peak amplitudes at the resonant frequencies. This more efficient computation of the notch filters also minimizes the amount of diminishment of the driving energy to the actuator assembly, resulting in a more responsive system.

Additionally, further response improvements are available by controlling the number and magnitude of computed notches within a preselected frequency band. For example, where there are six major resonances but only five notch filters are available, the number of filters computed within a relatively low frequency band can be restricted to only two, even if more than two of the major resonances occur within that low frequency band. Alternatively, frequency bands can be defined wherein no filters will be computed.

Furthermore, after the filters have been computed within the constraints described hereinabove, the phase loss may be determined at selected points of interest and compared to a preselected threshold as a pass/fail test.

Furthermore, in addition to notch filters, alternative embodiments of the present invention may comprise a combination of notch filters, low pass filters, and high pass filters, which are computed and assigned within selected frequency bands as hereinabove.

In another alternative embodiment the frequency response of the servo controller may be combined with the structure frequency response to yield a modified structure frequency response, which is then used in computing filters as hereinabove.

In summary, embodiments of the present invention are directed to a data storage device (such as 100) comprising a data storage disc (such as 108) adapted to store data and an actuator assembly (such as 110). The actuator assembly comprises a read/write head (such as 118) adapted to read data from and write data to the disc, and an actuator arm (such as 114) coupled to the head and controllably positionable to move the head relative to the disc in response to a driving energy. The data storage device further comprises a servo control circuit (such as 144) providing the driving energy, comprising an attenuating filter (such as 168) limiting the driving energy at resonant frequencies (such as 188) of the data storage device mechanical structure.

An attenuating filter is constructed in accordance with the embodiments of the present invention by a process comprising: (a) initiating a track seek condition moving the head to a selected track of the data storage disc (such as 300); (b) measuring the structure frequency response of the data storage device in terms of magnitude versus frequency between selected first and second frequencies (such as 302); (c) determining the peak amplitude of the magnitude in step (b) (such as 304); (d) determining the frequency associated with the maximum amplitude of step (c) (such as 307); (e) computing a notch filter centered at the frequency of step (d) (such as 308); (f) saving the notch filter in memory (such as 309); (g) creating a theoretical frequency domain of the notch filter in terms of magnitude versus frequency (such as 310); (h) summing the structure frequency response from step (b) and the frequency domain of the notch filter from step (g), deriving a modified structure frequency response (such as 312); (i) substituting the modified structure frequency response of step (h) for the structure frequency response in step (b) (such as 314) and repeating steps (c) through (h) until the peak amplitude of step (c) is less than a desired magnitude (such as 352); and (j) combining all the notch filters in memory of step (f), defining the attenuating filter (such as 306).

In one embodiment the actuator assembly comprises an electrical coil (such as 126) and the driving energy comprises an electrical current (such as 156) supplied to the electrical coil. The notch filter can be implemented according to a bilinear transfer function defining the gain of the notch filter in terms of the sampling rate of the servo system and numerical constants describing the frequency, depth and width of the frequency response of the notch filter. The servo control circuit can further comprise a power amplifier (such as 162) adapted to amplify the driving energy. In one embodiment the power amplifier amplifies the driving energy after the driving energy is filtered by the digital notch filter; alternatively, the power amplifier amplifies the driving energy before the driving energy is filtered by the digital notch filter. In one embodiment the notch filter can be incorporated within the servo control processor.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the methods employed to determine the structure frequency response and the peak amplitude of the structure frequency response may vary while maintaining substantially the same functionality without departing from the scope and spirit of the present invention. In addition, although the preferred embodiment described herein is directed to a data storage device, it will be appreciated by those skilled in the art that the teachings of the present invention can be applied to other systems, like data storage test or certification systems, servo track writers, optical data storage systems, or any other assembled product which can be automatically assembled, without departing from the scope and spirit of the present invention.

What is claimed is:

1. A data storage device, comprising:
   a data storage disc adapted to store data;
   an actuator assembly comprising:
      a read/write head adapted to read data from and write data to the disc;
      an actuator arm coupled to the head and controllably positionable to move the head relative to the disc in response to a driving energy;
   a servo control circuit providing the driving energy, comprising an attenuating filter limiting the driving energy at resonant frequencies of the data storage device mechanical structure, the attenuating filter constructed by a process comprising:
      (a) initiating a track seek condition moving the head to a selected track of the data storage disc;
      (b) measuring the structure frequency response of the data storage device in terms of magnitude versus frequency between selected first and second frequencies;
      (c) determining the peak amplitude of the magnitude in step (b);
      (d) determining the frequency associated with the maximum amplitude of step (c);

(e) computing a notch filter centered at the frequency of step (d);
(f) saving the notch filter in memory;
(g) creating a theoretical frequency domain of the notch filter of step (e) in terms of magnitude versus frequency;
(h) combining the frequency response of the structure from step (b) and the frequency domain of the notch filter from step (g), deriving a modified structure frequency response;
(i) substituting the modified structure frequency response of step (h) for the structure frequency response in step (b) and repeating steps (c) through (h) until the peak amplitude of step (c) is less than a desired magnitude; and
(j) combining all the notch filters in memory of step (f), defining the attenuating filter.

2. The data storage device of claim 1 wherein the actuator assembly comprises an electrical coil and the driving energy comprises an electrical current supplied to the electrical coil.

3. The data storage device of claim 1 wherein the notch filter is implemented according to a bilinear transfer function defining the gain of the notch filter in terms of the sampling rate of the servo system and numerical constants describing the frequency, depth and width of the frequency response of the notch filter.

4. The data storage device of claim 1 further comprising a power amplifier adapted to amplify the driving energy.

5. The data storage device of claim 4 wherein the power amplifier amplifies the driving energy after the driving energy is filtered by the digital notch filter.

6. The data storage device of claim 4 wherein the power amplifier amplifies the driving energy before the driving energy is filtered by the digital notch filter.

7. The data storage device of claim 1 wherein the notch filter is incorporated within the servo control processor.

8. A method for deriving an attenuating filter for a servo control processor sending a driving energy signal to position a read/write head in operable relation to a data storage surface in a data storage device, comprising:
(a) initiating a track seek condition moving the head to a selected track of the data storage surface;
(b) measuring the structure frequency response of the data storage device in terms of magnitude versus frequency between selected first and second frequencies;
(c) determining the peak amplitude of the magnitude in step (b);
(d) determining the frequency associated with the maximum amplitude of step (c);
(e) computing a notch filter centered at the frequency of step (d);
(f) saving the notch filter in memory;
(g) creating a theoretical frequency domain of the notch filter of step (e) in terms of magnitude versus frequency;
(h) combining the frequency response of the structure from step (b) and the frequency domain of the notch filter from step (g), deriving a modified structure frequency response;
(i) substituting the modified structure frequency response of step (h) for the structure frequency response in step (b) and repeating steps (c) through (h) until the peak amplitude of step (c) is less than a desired magnitude; and
(j) combining all the notch filters in memory of step (f), defining the attenuating filter.

9. The method of claim 8 wherein the computing step (e) comprises implementing a bilinear transfer function defining the gain of the notch filter in terms of the sampling rate of the servo system and numerical constants describing the frequency, depth and width of the frequency response of the notch filter.

10. The method of claim 9 wherein the saving step (f) comprises saving the numerical constants in memory.

11. The method of claim 10 wherein the saving step (f) comprises simultaneously saving two or more notch filters in memory.

12. The method of claim 8 wherein the head is coupled to an electrical coil and the initiating a track seek condition step (a) comprises supplying an electrical current to the electrical coil.

13. A data storage device, comprising:
an actuator assembly operably coupled with a data storage disc in a data reading and writing relationship; and
means for selectively moving the actuator assembly by a driving energy derived to reduce the actuator assembly frequency response below a desired magnitude at a resonant frequency.

14. The data storage device of claim 13 wherein the means for selectively moving comprises a controlled electrical current that is imparted to an electrical coil portion of the actuator assembly.

15. The data storage device of claim 13 wherein the means for selectively moving comprises a notch filter associated with an observed frequency response of the actuator assembly, reducing a frequency component of the driving energy corresponding to a resonant frequency of the actuator assembly, and a servo control processor coupled to the actuator, controlling the driving energy to the actuator assembly in response to an attenuating filter, the attenuating filter derived by summing the observed frequency response of the actuator assembly with the frequency response of the notch filter to derive a modified frequency response of the actuator assembly, forming the basis for the driving energy.

16. The data storage device of claim 15 wherein the means for selectively moving comprises an attenuating filter comprising two or more notch filters, wherein the attenuating filter is derived by summing the observed frequency response of the actuator assembly with the combined frequency response of the plurality of the notch filters to derive the modified frequency response of the actuator assembly.

17. The data storage device of claim 13 wherein the means for selectively moving comprises a power amplifier adapted to amplify the driving energy.

* * * * *